(12) United States Patent
Certain

(10) Patent No.: US 7,143,003 B2
(45) Date of Patent: *Nov. 28, 2006

(54) PILOT INDICATOR FOR PREDICTING CHANGES IN THE MONITORING PARAMETERS OF A GAS TURBINE ENGINE

(75) Inventor: Bernard Certain, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/147,218

(22) Filed: Jun. 8, 2005

(65) Prior Publication Data

US 2005/0278084 A1    Dec. 15, 2005

(30) Foreign Application Priority Data

Jun. 15, 2004   (FR) .................................. 04 06488

(51) Int. Cl.
  *G01P 5/00* (2006.01)
  *G01C 23/00* (2006.01)
(52) U.S. Cl. ..................................... 702/144
(58) Field of Classification Search ................ 702/144
  See application file for complete search history.

(56) References Cited

U.S. PATENT DOCUMENTS 5,050,081 A     9/1991   Abbott et al.
5,915,273 A  *  6/1999   Germanetti ................ 73/178 H
5,986,580 A  * 11/1999   Permanne ................... 340/946
2006/0030975 A1* 2/2006  Certain ......................... 701/3

FOREIGN PATENT DOCUMENTS

| | | |
|---|---|---|
| DE | 4125372 | 8/1992 |
| FR | 2731069 | 8/1996 |
| FR | 2749545 | 12/1997 |

* cited by examiner

Primary Examiner—John Barlow
Assistant Examiner—Cindy D. Khuu
(74) Attorney, Agent, or Firm—Young & Thompson

(57) ABSTRACT

A pilot indicator is provided for an aircraft provided with at least one gas turbine engine. The indicator includes a set of sensors delivering information relating to different monitoring parameters of the engine, namely: the speed of rotation Ng of the gas generator, the temperature T4 of the gas at the inlet of the free turbine, and the torque Cm. The indicator is also provided with a processor for processing information from the sensors, and a display provided with a display screen. In addition, the processor determines an estimated value of a limiting parameter, where the limiting parameter is that one of the monitoring parameters that is closest to its limit.

14 Claims, 1 Drawing Sheet

PILOT INDICATOR FOR PREDICTING CHANGES IN THE MONITORING PARAMETERS OF A GAS TURBINE ENGINE

The present invention relates to a pilot indicator for an aircraft provided with at least one gas turbine engine, the indicator serving to predict changes in the monitoring parameters of said engine during acceleration stages known as "transient" stages. Such an indicator is more specifically adapted to a rotorcraft, and in particular to a helicopter.

BACKGROUND OF THE INVENTION

When flying a helicopter, the pilot needs to monitor numerous instruments on the instrument panel, most of which instruments represent the operation of the engine unit and of the aircraft. For physical reasons, there are numerous limits that the pilot must take into account at all times while flying. These various limits depend in general on the stage of flight and on outside conditions.

Most presently-built helicopters are fitted with one or two free-turbine engines. Power is then taken from a low pressure stage of the free turbine, which stage is mechanically independent of the compressor unit and of the high pressure stage of the engine. The free turbine of such an engine rotates at a speed lying in the range 20,000 revolutions per minute (rpm) to 50,000 rpm, so a reduction gearbox is needed for its connection to the main rotor which rotates at a speed that lies substantially in the range 200 rpm to 400 rpm: this is the main transmission gearbox.

The thermal limits of the engine and the torque limits of the main transmission gearbox serve to define three normal operation ratings for a gas turbine engine:

takeoff rating, usable for five to ten minutes and corresponding to the transmission gearbox being subjected to a level of torque and the engine to a degree of heating that can be accepted for a short time without significant damage: this is maximum takeoff power (PMD);

maximum continuous rating during which, at all times, care is taken to avoid exceeding the capabilities of the transmission gearbox, or the maximum heating that can be accepted continuously by the high pressure blades of the first stage of the turbine: this is maximum continuous power (PMC); and maximum transient rating, optionally capped by regulations: this is referred to as maximum transient power (PMT).

There also exist emergency overload ratings on multi-engine aircraft, that are used in the event of one engine breaking down:

emergency rating during which the capabilities of the inlet stages of the transmission gearbox and the temperature margin of the engine are used to the full: this is referred to as super-emergency power (PSU) and can be used at most for thirty consecutive seconds, and three times only in any one flight; if PSU has been used, then the engine must be removed and overhauled;

emergency rating during which the capabilities of the inlet stages of the transmission gearbox and the temperature margin of the engine are used to a considerable extent: this is referred to as maximum emergency power (PMU) and can be used for two minutes after SEP or for two minutes and thirty seconds consecutively at the most; and emergency rating during which the capabilities of the inlet stages of the transmission gearbox and the temperature margin of the engine are used, but without inflicting damage: this is referred to as intermediate emergency power (PIU) and can be used for thirty minutes or continuously for the remainder of the flight after an engine breakdown.

The engine manufacturer uses calculation or testing to draw up curves repenting the power available from a gas turbine engine as a function of altitude and temperature, and for each of the above-defined ratings.

The limits specified are generally monitored via three parameters: gas generator speed; engine torque; and the temperature at which gas is ejected into the inlet of the free turbine, respectively written Ng, Cm, and T4 by the person skilled in the art.

Document FR 2 749 545 discloses a pilot indicator that identifies that one of the monitoring parameters of the engine that is closest to its limit. The information relating to the limits that need to be complied with is thus reduced to a single display, firstly making it possible to provide a summary by presenting solely the result of this summary in order to simplify the task of the pilot, and secondly making it possible to save space in the instrument panel. This produces a "limiting parameter" selected from said monitoring parameters of the engine, and constituted by the value of the monitoring parameter which is presently the closest to its limit value. That is why such an indicator is also referred to below as a first limit instrument or in abbreviation FLI.

This FLI thus makes it possible to determine the present value at any given instant of the limiting parameter. However, when about to perform a maneuver, the pilot cannot tell whether the limiting parameter is going to exceed its limit.

OBJECTS AND SUMMARY OF THE INVENTION

An object of the present invention is thus to propose a pilot indicator for predicting changes in the monitoring parameters of an aircraft so as to allow the pilot to modify a maneuver, should that be necessary.

In the invention, a pilot indicator for an aircraft provided with at least one gas turbine engine for propulsion or even for lift includes a set of sensors delivering respective items of information relating to a set of monitoring parameters of said aircraft. The indicator is also provided with means for processing the information coming from the set of sensors and with display means having a display screen.

The invention is remarkable insofar as the processor means determine an estimated value of a limiting parameter, said limiting parameter being the monitoring parameter that is closest to its limit. This estimated value is displayed on the screen, e.g. by means of a first needle, and represents a prediction of how the limiting parameter is going to change.

Advantageously, the set of monitoring parameters of said aircraft comprises monitoring parameters of the engine, i.e. a first speed of rotation for the gas generator, a temperature for the gas at the inlet of the free turbine, and an engine torque as measured respectively by first, second, and third sensors of the set of sensors.

In this way, the pilot of the aircraft knows in advance whether one of the monitoring parameters of the engine is going to exceed the limit set by the manufacturer. Under such conditions, the pilot can modify the intended maneuver so as to save the engine from damage that would be detrimental to flight safety.

According to the invention, during acceleration of the engine, the processor means determine the estimated value from the following predictive relationship in acceleration, in which IPT, IPL, k, and dIPL/dt correspond respectively to the estimated value of the limiting parameter, the present value of the limiting parameter, a multiplier coefficient, and the variation of the present value over a time interval:

$$IPT = IPL + \left(k\frac{dIPL}{dt}\right)^4$$

The fourth power of the term $$\left(k\frac{dIPL}{dt}\right)$$

serves to limit the impact of signal noise, if any. This serves to avoid the first needle shaking, which could cause the information given to the pilot by the pilot indicator of the invention to become unusable.

Furthermore, during a stage of engine deceleration, there is no need to predict changes in the monitoring parameters of the engine. Indeed, The purpose of the invention is to allow the pilot to anticipate a maneuver for the purpose of preserving the engine. However a significant drop in the value of one of these three monitoring parameters can occur only by the engine breaking down. Under such circumstances, only the main or the emergency device for regulating the fuel delivery rate might be able to solve the problem. So, during this transient stage, the processor means considers that the estimated value is identical to the present value of the limiting parameter.

In addition, in order to ensure that the predictive relationship for use in acceleration is representative, the multiplier coefficient lies in the range 0 to 0.5. This depends on the engine in question, and is determined by the manufacturer performing tests.

In addition, the multiplier coefficient varies depending on the nature of the limiting parameter. Preferably, it possesses the following characteristics:
  when the limiting parameter is the first speed of rotation Ng of the gas generator of said engine, said multiplier coefficient k is substantially equal to 0.376;
  when the limiting parameter is the temperature T4 of the gas at the inlet to the free turbine of said engine, said multiplier coefficient k is substantially equal to 0.18; and
  when the limiting parameter is the torque Cm of said engine, said multiplier coefficient k is substantially equal to 0.088.

The pilot indicator based on the predictive relationship for acceleration as described above operates properly, in particular for normal maneuvers. However, an analysis of test results has shown that during sudden maneuvers, e.g. a large increase in the pitch of the blades of the main rotor of a helicopter, the estimated value can be exaggeratedly high.

To avoid this phenomenon, the processor means limit the estimated value by determining a maximum estimated value. As for the multiplier coefficient, this maximum estimated value depends on the engine and needs to be determined by tests carried out by the manufacturer.

If the limiting parameter is the first speed of rotation Ng of the gas generator, then the maximum estimated value is equal to the speed of rotation Ng of the gas generator plus:
  10% when the first speed of rotation Ng is less than 87%;
  1% when the first speed of rotation Ng is greater than 100%; and
  a percentage that decreases linearly from 10% to 1% when the first speed of rotation Ng varies over the range 87% to 100%.

If the limiting parameter is the gas ejection temperature T4, then the maximum estimated value is equal to the temperature T4 plus:
  50° C. when the temperature T4 is less than 650° C.;
  10° C. when the temperature T4 is greater than 830° C.; and
  a temperature that decreases linearly from 50° C. to 10° C. when the temperature T4 lies in the range 650° C. to 830° C.

If the limiting parameter is said engine torque Cm, then the maximum estimated value is equal to the engine torque Cm plus:
  40% when the engine torque Cm is less than 40%;
  2% when the engine torque Cm is greater than 100%; and
  a percentage that decreases linearly from 40% to 2% when the engine torque Cm lies in the range 40% to 100%.

Finally, in a variant of the invention, the present value is displayed on the display screen preferably using means identical to the means used for displaying the estimated value, e.g. a second needle.

Furthermore, when the estimated value crosses a maximum limit threshold, the processor means advantageously issues a warning signal, an audible and/or visible alarm, in order to attract the pilot's attention.

BRIEF DESCRIPTION OF THE DRAWING

The invention and its advantages appear in greater detail from the following description of an embodiment given by way of illustration with reference to the accompanying figures, in which.

MORE DETAILED DESCRIPTION

Elements shown in more than one figure are given the same references in each of them.

Figure 1:
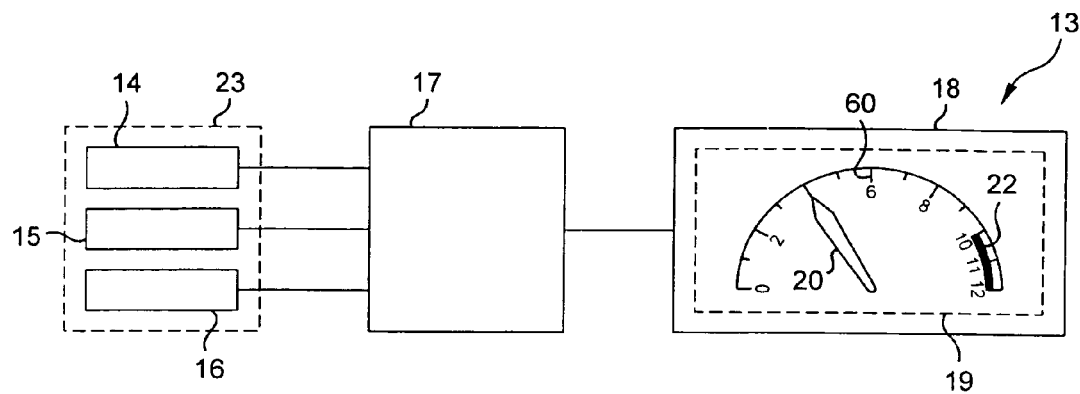
FIG. 1 is a diagrammatic view of a pilot indicator of the invention.

FIG. 1 is a diagrammatic view of a pilot indicator 13 of the invention.

It is provided with a set of sensors 23 comprising first, second, and third sensors 14, 15, and 16 delivering information to processor means 17 independently of one another, said information relating to different monitoring parameters of at least one gas turbine engine of an aircraft. Specifically, these parameters are respectively the first speed of rotation Ng of the gas generator, the temperature T4 of the gas at the inlet to the free turbine, and the engine torque Cm.

The processor means 17 reduces the values of the monitoring parameters to scales that are comparable. The monitoring parameter of value as scaled in this way that is closest to its limit then constitutes the present value of a parameter referred to as the limiting parameter.

In addition, the processor means 17 also calculates the estimated value of the limiting parameter, i.e. the value that it is expected this limiting parameter will reach at the end of a transient stage.

To do this, during an acceleration of the engine, the processor means uses the following predictive relationship in acceleration in which IPT, IPL, k, and dIPL/dt correspond respectively to the estimated value of the limiting parameter, the present value of the limiting parameter, a multiplier coefficient, and variation in said present value over a time interval:

$$IPT = IPL + \left(k\frac{dIPL}{dt}\right)^4$$

During deceleration of the engine, the processor means 17 considers that the estimated value of the limiting parameter is equal to its present value.

In addition, in order to ensure that the predictive relationship in acceleration is representative, the multiplier coefficient k lies in the range 0 to 0.5. This value varies from one type of engine to another, and it is determined by the manufacturer performing tests.

Furthermore, the multiplier coefficient k also depends on the nature of the limiting parameter. Preferably, it is substantially equal to:

0.376 where the limiting parameter is the first speed of rotation Ng;

0.18 when the limiting parameter is the temperature T4; or 0.088 when the limiting parameter is engine torque Cm.

Furthermore, the processor means 17 sends the present and estimated values to a display means 18. The display means is provided with a display screen 19 having a range 22 and numbered graduations 60, e.g. going from 0 to 12. A first needle 20 serves to indicate the estimated value. Nevertheless, it would not go beyond the ambit of the present invention for the estimated value to be displayed in some other form, whether analog or digital, for example by switching spots in a row of spots ON and OFF.

As shown in FIG. 1, during a stabilized stage, the first needle 20 corresponds, for example, to graduation 4.

Figure 2:
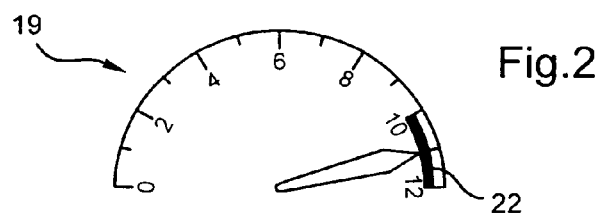
FIG. 2 is a diagrammatic view of the display screen of said pilot indicator.

In contrast, FIG. 2 shows the display when the aircraft begins a maneuver that requires the engine to accelerate.

The first needle 20 showing the estimated value moves well over to the right and indicates that at the end of the maneuver the limiting parameter will have reached a value corresponding to graduation 11, for example.

It can be seen that the first needle 20 is then in the range 22. This informs the pilot that at least one of the monitoring parameters of the engine is going to exceed a maximum limit threshold as set by the manufacturer. Under such conditions, the pilot is still in a position to modify the maneuver so as to avoid possibly damaging of the engine.

The maximum limit threshold as set by the manufacturer corresponds, for example, to graduation 10, i.e. to the beginning of the range 22. Advantageously, the processor means 17 issues a warning signal, an audible and/or a visible alarm, to attract the attention of the pilot whenever the estimated value exceeds the maximum limit threshold.

Figure 3:
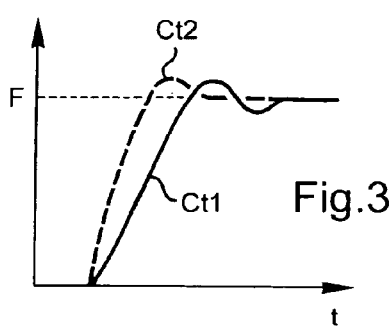
FIG. 3 is a graph showing how the limiting parameter varies and showing the estimated value as a function of time.

FIG. 3 is a graph showing how the limiting parameter varies and how the estimated value varies as a function of time during acceleration of the engine.

A curve Ct1 shows the variation in the present value of the limiting parameter. The present value increases progressively and then oscillates in transient manner prior to stabilizing on a final value F.

A curve Ct2 shows how the estimated value varies. Its shape is substantially identical to the shape of the curve Ct1. However, the prediction made enables the final value F to be obtained early, which as mentioned above, is of considerable help to the pilot from the decision-making point of view.

Figure 4:
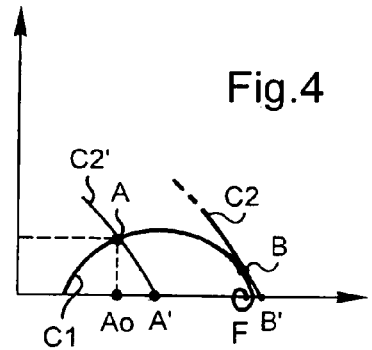
FIG. 4 is a graph showing how the derivative of the limiting parameter varies and showing the predictive relationship at two distinct instants.

FIG. 4 is a graph showing how the derivative of the limiting parameter (curve C1) varies as a function of the limiting parameter during acceleration of the engine, and it shows the predictive relationship in acceleration at two distinct instants (curve C2' at instant A and curve C2 at instant B).

At instant A, the present value of the limiting parameter is A0 and the estimated value A'. This estimated value does not yet represent the final value F of the limiting parameter. Nevertheless it gives an indication that is correct insofar as it lies between the present value A0 and the final value F of the limiting parameter.

As from instant B, the prediction performed by the processor means 17 via the above-described predictive relationship in acceleration is accurate since the estimated value B' is then very close to the final value F. As a result, the pilot can have an accurate and realistic view of the forthcoming situation.

Nevertheless, during a sudden acceleration, e.g. leading to the engine being accelerated hard, the prediction can be insufficiently accurate and can give rise to an estimated value that is misleadingly high.

Figure 5:
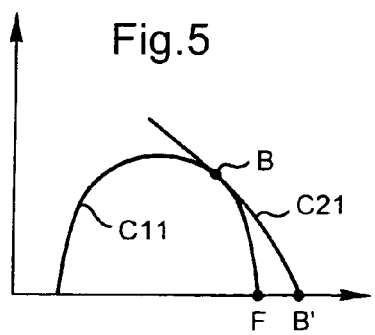
FIG. 5 is a graph showing the need to limit the estimated value in some cases.

To illustrate this possibility, reference can be made to FIG. 5 in which curves C11 and C21 show respectively the variation in the derivative of the limiting parameter varies as a function of the limiting parameter and the predictive relationship in acceleration at instant B.

Since the engine is accelerating hard, unlike the preceding example, the estimated value B' at instant B is considerably greater than the final value F of the limiting parameter.

Figure 6:
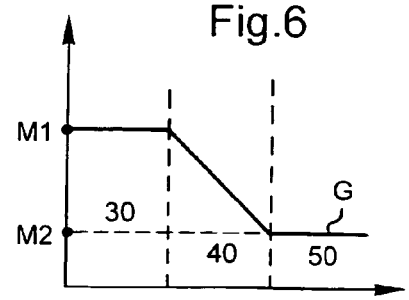
FIG. 6 is a graph showing the maximum increases in the estimated value.

To remedy this drawback, the processor means 17 limit the estimated value by applying a maximum estimated value thereto, as shown in FIG. 6.

To do this, the processor means 17 uses the diagram of FIG. 6 which shows a maximum allowable increase as a function of the value of the limiting parameter, where the limiting parameter can be any one of the three monitoring parameters of the engine. The maximum estimated value is then equal to the present value of the limiting parameter with said maximum allowable increase added thereto.

In the diagram, there can be seen first, second, and third zones 30, 40, and 50. In the first and third zones 30 and 50, the increase is constant with respective values M1 and M2. In the second zone 40, the increase varies linearly from M1 to M2 (i.e. it decreases).

The increases M1 and M2 depend on the engine and on the nature of the limiting parameter. As a result they are determined by the manufacturer by testing.

If the limiting parameter is the first speed of rotation Ng of the gas generator, then the maximum estimated value is advantageously equal to the speed of rotation Ng plus:

10% when the first speed of rotation Ng is less than 87%;

1% when the first speed of rotation Ng is greater than 100%; and a percentage that decreases linearly from 10% to 1% when the first speed of rotation Ng varies over the range 87% to 100%.

Similarly, if the limiting parameter is the temperature T4 of the gas at the inlet to the free turbine, the maximum estimated value is advantageously substantially equal to the temperature T4 plus:

50° C. when the temperature T4 is less than 650° C.;
10° C. when the temperature T4 is greater than 830° C.; and
a temperature that decreases linearly from 50° C. to 10° C. when the temperature T4 lies in the range 650° C. to 830° C.

If the limiting parameter is engine torque Cm, the maximum estimated value is advantageously substantially equal to the engine torque Cm plus:

40% when the engine torque Cm is less than 40%;
2% when the engine torque Cm is greater than 100%; and
a percentage that decreases linearly from 40% to 2% when the engine torque Cm lies in the range 40% to 100%.

Finally, in a variation of the invention, not shown in the figure, the present value of the limiting parameter is displayed on the display screen, preferably by means identical to that used for displaying the estimated value. If said means is constituted by a needle, a second needle corresponds to the present value, with the first 20 and second needles having different colors so as to be visually distinguished.

Naturally, the present invention can be implemented in a wide variety of ways. Although one implementation is described above, it will readily be understood that it is not conceivable to identify exhaustively all possible implementations. Naturally it is possible to envisage replacing any of the means described by equivalent means without going beyond the ambit of the present invention.

What is claimed is:

1. A pilot indicator (13) for an aircraft having at least one gas turbine engine for propulsion or even for lift, the indicator comprising a set of sensors (23) delivering information relating to a set of monitoring parameters of said aircraft, and further comprising processor means (17) for processing information coming from said set of sensors, and display means (18) provided with a display screen (19), said processor means (17) determining an estimated value of a limiting parameter, where said limiting parameter is the monitoring parameter that is closest to its limit, wherein, during acceleration of the engine, said processor means (17) determine said estimated value from the following predictive relationship in acceleration, in which IPT, IPL, k, and dIPL/dt correspond respectively to said estimated value of the limiting parameter, the present value of the limiting parameter, a multiplier coefficient, and the variation of said present value over a time interval:

$$IPT = IPL + k\left(\frac{dIPL}{dt}\right)^4.$$

2. A pilot indicator according to claim 1, wherein said set of monitoring parameters of said aircraft comprises monitoring parameters of said engine, comprising a first speed of rotation Ng of the gas generator; a temperature T4 of the gas at the inlet to the free turbine; and an engine torque Cm, as measured respectively by first, second, and third sensors (14, 15, 16) of said set of sensors (23).

3. A pilot indicator according to claim 2, wherein said multiplier coefficient k lies in the range of 0 to 0.5.

4. A pilot indicator according to claim 3, wherein, when the limiting parameter is the first speed of rotation Ng of the gas generator of said engine, said multiplier coefficient k is substantially equal to 0.376.

5. A pilot indicator according to claim 3, wherein, when the limiting parameter is the temperature T4 of the gas at the inlet to the free turbine of said engine, said multiplier coefficient k is substantially equal to 0.18.

6. A pilot indicator according to claim 3, wherein, when the limiting parameter is the torque Cm of said engine, said multiplier coefficient k is substantially equal to 0.088.

7. A pilot indicator according to claim 1, wherein said processor means (17) limits said estimated value by determining a maximum estimated value.

8. A pilot indicator according to claim 7, wherein, when said limiting parameter is the first speed of rotation Ng of the gas generator of said engine, said maximum estimated value is equal to said speed of rotation Ng of the gas generator plus:

10% when the first speed of rotation Ng is less than 87%;
1% when the first speed of rotation Ng is greater than 100%; and
a percentage that decreases linearly from 10% to 1% when the first speed of rotation Ng varies over the range 87% to 100%.

9. A pilot indicator according to claim 7, wherein, when said limiting parameter is the temperature T4 of the gas at the inlet of the free turbine of said engine, said maximum estimated value is equal to said temperature T4 plus:

50° C. when the temperature T4 is less than 650° C.;
10° C. when the temperature T4 is greater than 830° C.; and
a temperature that decreases linearly from 50° C. to 10° C. when the temperature T4 lies in the range of 650° C. to 830° C.

10. A pilot indicator according to claim 7, wherein, when said limiting parameter is said torque Cm of said engine, said maximum estimated value is equal to said torque Cm plus:

40% when the engine torque Cm is less than 40%;
2% when the engine torque Cm is greater than 100%; and
a percentage that decreases linearly from 40% to 2% when the engine torque Cm lies in the range of 40% to 100%.

11. A pilot indicator according to claim 1, wherein, during deceleration of the engine, said processor means (17) assumes that the estimated value is equal to the present value of said limiting parameter.

12. A pilot indicator according to claim 1, wherein said processor means (17) issues a warning signal when said estimated value exceeds a maximum limit threshold.

13. A pilot indicator according to claim 1, wherein said estimated value is displayed on said display screen.

14. A pilot indicator according to claim 1, wherein the present value of said limiting parameter is displayed on said display screen.

* * * * *